United States Patent
Brandmair

(10) Patent No.: US 10,562,011 B2
(45) Date of Patent: Feb. 18, 2020

(54) CATALYST AND PROCESS FOR NITRIC OXIDE REDUCTION IN A WASTE GAS

(71) Applicant: Johnson Matthey Catalysts (Germany) GmbH, Redwitz an der Rodach (DE)

(72) Inventor: Maria Theresia Brandmair, Fahrenzhausen (DE)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 14/482,090

(22) Filed: Sep. 10, 2014

(65) Prior Publication Data

US 2015/0071841 A1 Mar. 12, 2015

(30) Foreign Application Priority Data

Sep. 12, 2013 (DE) .................. 10 2013 015 117

(51) Int. Cl.
| | | |
|---|---|---|
| *B01J 23/22* | (2006.01) | |
| *B01D 53/86* | (2006.01) | |
| *B01J 21/06* | (2006.01) | |
| *B01J 21/16* | (2006.01) | |
| *B01J 23/28* | (2006.01) | |
| *B01J 23/652* | (2006.01) | |
| *B01J 29/06* | (2006.01) | |
| *B01J 35/04* | (2006.01) | |
| *B01J 37/04* | (2006.01) | |
| *B01J 23/648* | (2006.01) | |

(52) U.S. Cl.
CPC .......... *B01J 23/22* (2013.01); *B01D 53/8628* (2013.01); *B01J 21/063* (2013.01); *B01J 21/16* (2013.01); *B01J 23/28* (2013.01); *B01J 23/6482* (2013.01); *B01J 23/6525* (2013.01); *B01J 29/06* (2013.01); *B01J 35/04* (2013.01); *B01J 37/04* (2013.01); *B01D 2255/20723* (2013.01)

(58) Field of Classification Search
None
See application file for complete search history.

(56) References Cited

U.S. PATENT DOCUMENTS

| | | | | |
|---|---|---|---|---|
| 3,929,672 A | * | 12/1975 | Ward ....................... | B01J 20/18 423/713 |
| 4,140,654 A | * | 2/1979 | Yoshioka ........... | B01D 53/9418 423/239.1 |
| 4,485,184 A | | 11/1984 | Hettinger, Jr. et al. | |
| 4,564,604 A | * | 1/1986 | Iida .................... | B01D 53/8628 423/239.2 |
| 4,722,918 A | | 2/1988 | Schneider et al. | |
| 4,734,391 A | | 3/1988 | Schneider et al. | |
| 4,855,115 A | * | 8/1989 | Imanari .............. | B01D 53/8628 423/239.1 |
| 4,935,393 A | * | 6/1990 | Schwetje ............... | B01J 29/126 2/64 |
| 4,977,127 A | * | 12/1990 | Rikimaru ........... | B01D 53/8628 423/239.1 |
| 5,272,125 A | * | 12/1993 | Weible .................. | B01D 53/944 502/242 |
| 5,273,125 A | * | 12/1993 | Jurewicz .................. | B22F 7/06 175/420.2 |
| 5,336,651 A | | 8/1994 | Yoshimoto et al. | |
| 6,475,944 B1 | | 11/2002 | Yang et al. | |
| 9,550,146 B2 | | 1/2017 | Kato et al. | |
| 2005/0020446 A1 | | 1/2005 | Choudhary et al. | |
| 2009/0005235 A1 | * | 1/2009 | Lee .......................... | B01J 21/20 502/25 |
| 2009/0143221 A1 | * | 6/2009 | Ogunwumi .......... | B01D 53/944 502/67 |
| 2011/0274607 A1 | | 11/2011 | Reddy et al. | |
| 2012/0100052 A1 | | 4/2012 | Gadgil et al. | |
| 2012/0315206 A1 | | 12/2012 | Jensen et al. | |
| 2013/0190166 A1 | | 7/2013 | Kato et al. | |

FOREIGN PATENT DOCUMENTS

| | | |
|---|---|---|
| CN | 101445956 A | 6/2009 |
| CN | 02453513 A | 5/2012 |
| CN | 102600826 A | 7/2012 |
| CN | 103349981 A | 10/2013 |
| DE | 102004030302 A1 | 1/2006 |
| EP | 0219854 A2 | 4/1987 |
| EP | 0762925 B1 | 3/1997 |
| EP | 2614886 A1 | 7/2013 |
| JP | S52126690 A | 10/1977 |
| JP | S6328452 A | 2/1988 |
| JP | S63126560 A | 5/1988 |
| JP | H04110038 A | 4/1992 |
| JP | H05244 A | 1/1993 |
| JP | H0716462 A | 1/1995 |
| JP | 2006223959 A | 8/2006 |
| JP | 2008-212799 A | 9/2008 |
| JP | 2014237099 A | 12/2014 |
| WO | 9403268 A1 | 2/1994 |
| WO | 2011003853 A2 | 1/2011 |

OTHER PUBLICATIONS

V.V.Kafarov, Principles of creating non-waste chemical production plants, Chemistry Publishing House, 1982, 288 pages.
Yuan et al.; Simultaneous Adsorption of Na and Pb Compunds by Kaolinite; Journal of Engineering Thermophysics; Jan. 2013, vol. 34, No. 1.

* cited by examiner

*Primary Examiner* — Sheng H Davis

(57) ABSTRACT

In order to improve the lifetime of an SCR catalyst in the waste gas purification by means of the SCR process of waste gas of a biomass combustion plant, the catalyst comprises a sacrificial component selected from a zeolite and/or a clay mineral, in particular halloysite. During operation, catalyst poisons contained in the waste gas, in particular alkali metals, are absorbed by the sacrificial component so that catalytically active centers of the catalyst are not blocked by the catalyst poisons.

10 Claims, No Drawings

CATALYST AND PROCESS FOR NITRIC OXIDE REDUCTION IN A WASTE GAS

CROSS-REFERENCE TO RELATED APPLICATIONS

This application claims priority of German Patent Application No. 10 2013 015 117.1, filed Sep. 12, 2013, the disclosures of which are incorporated herein by reference in their entirety for all purposes.

The invention relates to a catalyst and to a process for nitric oxide reduction in a waste gas, wherein the catalyst comprises a catalytically active component comprising vanadium.

Such a catalyst and such a process are to be found in US 2012/0315206 A1.

For nitric oxide reduction, the process of selective catalytic reduction (SCR process) is frequently used, in which nitric oxides are reduced in the presence of ammonia to nitrogen and water by means of a catalyst. Various types of catalyst are known both in respect of their chemical composition and in respect of their structural design.

The catalysts generally comprise a catalyst mass, which generally consists for the most part of a support mass and which comprises at least one additional catalytically active component. Known catalysts, such as are used, for example, in large-scale combustion plants, are in the form of titanium-vanadium catalysts. They comprise as the support mass titanium dioxide and in addition, as the catalytically active component, vanadium oxide and, in addition, frequently also tungsten oxide or molybdenum oxide. The amount of the catalytically active components together with a support mass is in the range of from 0.1% by weight to 16% by weight of the total weight of the catalyst.

As geometric structural forms there are known so-called plate catalysts, in which the waste gas to be purified flows through flow channels formed by opposing plates. In addition there are also fully extruded catalysts, in particular in honeycomb form, in which a monolithic catalyst is formed from the catalyst mass, for example by an extrusion process. In both variants, the catalytically active component can either be embedded in the volume of the catalyst or applied to the surface as a coating.

In particular in the large-scale plant sector, when the catalysts are used in a waste gas purification system of a large-scale combustion plant, catalysts of the titanium-vanadium type are frequently used. EP 0 762 925 B1 describes such a titanium-vanadium catalyst which has been found to be particularly suitable.

A problem with such catalysts is a gradual reduction of the catalytic activity when so-called catalyst poisons are contained in the waste gas. The action thereof is based on the fact that such catalyst poisons, in particular alkali metals, occupy catalytically active centres of the catalytically active component, so that the catalytic activity is reduced. Catalytically active centres are generally regarded as being Brønsted acids as proton donors or Lewis acids as electron acceptors. Deactivation by such catalyst poisons is based on the fact that an alkali ion binds to these acid centres and thereby blocks them for ammonia absorption. A particularly aggressive catalyst poison is in particular potassium. The problem of catalyst poisons varies greatly depending on the fuel used for the combustion plant. The problem is enhanced in the case of the combustion of biomass, such as, for example, wood or other plant fuels. The waste gases thereof are also characterized by a high ash content.

In order to solve this problem, US 2012/0315206 A1 proposes applying to the catalyst a coating comprising a metal oxide. This coating is intended to prevent the catalytically active cells from being occupied by the alkali metal ions, on the one hand by preventing the migration of the alkali metal ions to the catalytically active centres and on the other hand by binding the alkali metal ions to the metal oxides of the coating.

Starting therefrom, the object underlying the invention is to increase the resistance of the catalyst to catalyst poisons, in particular to alkali metals in the waste gas of biomass-fired combustion plants.

The object is achieved according to the invention by a catalyst for nitric oxide reduction in particular by the method of selective catalytic reduction, wherein the catalyst is used during operation in particular in a waste gas purification system of a large-scale combustion plant which burns biomass on its own or with another fuel. The catalyst is of the vanadium type, that is to say it comprises a catalytically active component comprising at least vanadium. In the presence of a catalyst poison, namely in particular of an alkali metal, in the waste gas, there is the risk that the active component will be deactivated at least partially by occupation of the catalytically active cells. In order at least largely to avoid such deactivation, a sacrificial component selected from a molecular sieve and a clay mineral is present in addition to the catalytically active component, the catalyst poison being deposited on the sacrificial component during operation.

The molecular sieve is a molecular sieve of preferably large or medium pore size. Molecular sieves are conventionally composed of a porous framework structure which contains ring structures composed in particular of atoms in a tetrahedral arrangement. A typical representative of such framework structures composed of atoms in a tetrahedral arrangement is the group of the zeolites, in which such ring structures are formed. Medium pore size is understood as meaning that, in a molecular sieve having a framework structure that forms a ring structure, the ring is formed of at least ten atoms. Large pore size is understood as meaning ring structures formed of at least twelve atoms.

With the sacrificial component, use is made of the fact that this component acts almost as a dirt trap for the catalyst poisons, which are preferentially deposited on the sacrificial component. Tests have shown that molecular sieves, on the one hand, are particularly suitable for this purpose owing to their good absorptive capacity in particular for alkali metals. In addition, on account of a similar mode of action, clay minerals have also been found to be particularly efficient dirt traps in the above sense. Tests have shown that, both with molecular sieves and with systems based on clay minerals, it has been possible to achieve a significant increase in the resistance of the catalyst to catalyst poisons and thus a lengthening of its lifetime.

The use of the sacrificial component is suitable in principle in the case of a very wide variety of catalyst systems which are sensitive in particular to alkali metals as catalyst poisons. The catalysts can also be different in terms of structure, for example in the form of a (full) extrudate, in the form of a plate catalyst or in the form of a coating on a support. In a first variant embodiment, the sacrificial component can be applied as a coating or as part of a coating.

In an expedient further development, however, the sacrificial component is mixed with the active component. The sacrificial component and the active component are thereby mixed with one another either heterogeneously or homogeneously and form a common mass or layer.

The catalyst is thereby processed to a crude mass by mixing of the starting components, which are conventionally in powder form, and the crude mass is then brought into a desired form of the catalyst, for example in the form of a full extrudate or in the form of a plate. The blank is then dried and finally sintered or calcined. Such a production process is described in EP 0 762 925 B1, for example, and is known per se. In this respect, reference is made thereto.

The catalyst described herein is preferably of heterogeneous structure and therefore is in particular applied to a support substrate. The support substrate is in a suitable form for waste gas treatment, for example in the form of a plate, a perforated plate, a porous ceramics honeycomb or the like. The catalytically active component and the sacrificial component are preferably applied to the support substrate in a suitable manner, for example in the form of a coating of the surface or of a surface region of the support substrate or alternatively in the form of a coating of the support substrate which permeates the porous support substrate partially or completely.

The catalytically active component and the sacrificial component are expediently applied in the manner of a layer structure. In particular, there are applied to the support substrate first the catalytically active component and, as the outer component, the sacrificial component. Effective protection of the catalytically active component from the catalyst poisons is thereby achieved. Alternatively, the active component is mixed with the sacrificial component and applied as a common layer.

In an expedient further development, it is provided that the sacrificial component is applied only in a portion of the catalyst, in particular in a forward inflow region of the catalyst. The inflow region is here understood as meaning the region which, in the fitted state, in the direction of flow of the waste gas to be purified, is first subjected thereto. Effective protection of the catalytically active component is thereby achieved on the one hand, because the catalyst poisons are trapped almost at the start of the catalyst. On the other hand, a high catalytic activity is further ensured because the catalytic activity of the catalyst is no longer impaired by the sacrificial component in the rearward portion of the catalyst.

In order that the sacrificial component exhibits as good a decontamination efficiency as possible, the molecular sieve is expediently free or largely free of alkali metals or transition metals. In particular, the molecular sieve is also free or largely free of any metals that do not belong to the framework structure. This includes in particular also configurations in which the molecular sieve is free or substantially free of ion-exchanged metals. The molecular sieve is therefore in particular not a metal-exchanged molecular sieve, that is to say it does not contain any replaced metals of the framework structure. The expression "substantially free" is understood as meaning that the molecular sieve contains the metal in an amount of not more than 0.1% by weight, preferably not more than 0.01% by weight and particularly preferably not more than 0.001% by weight, based on the total weight of the molecular sieve.

The molecular sieve is expediently in the form of a zeolite, in particular in the form of a so-called $H^+$ zeolite. In this zeolite, the protons are unoccupied, so that the catalyst poisons can be trapped effectively.

This zeolite system is in principle not a catalytically active zeolite. The zeolites are therefore in particular not loaded with a metal, such as, for example, iron and copper, as is the case when zeolites are used as the catalytically active component.

During use, therefore, the sacrificial component generally absorbs the catalyst poisons, in particular potassium, until the sacrificial component is saturated and becomes inactive in respect of its decontaminating properties. Even if the zeolite used here for the sacrificial component contains metal, it is fundamentally different from a metal-loaded zeolite as is conventionally used as an SCR catalyst. For an SCR catalyst based on zeolites there are conventionally used metal-exchanged zeolites in which a metallic ion exchange takes place during production at low temperatures of the catalyst, the exchanged metal ions subsequently being fixed to the zeolite structure in the conventional calcination. In the case of the zeolites used here for the sacrificial component, there are no metal ion exchange processes during the production process at low temperatures with subsequent calcination. In this respect, therefore, the zeolite used is untreated during production.

The zeolite used in the present case as the sacrificial component is further different from a metal-loaded zeolite which is suitable as an SCR catalyst in that the zeolite used here as the sacrificial component is not designed to trap all metallic catalyst poisons in the waste gas stream. Rather, it is designed to divert such catalyst poisons at least partially and/or keep them from the vanadium-based active component in order to protect it from poisoning. By contrast, in the production of a metal-loaded zeolite for use as an SCR catalyst, complete ion exchange is desirable in order to trap the greatest amount of metal ions as possible during the exchange process in production. Typically, copper- or ion-exchanged zeolites are nowadays used for SCR catalysts.

As molecular sieves, aluminium silicate, iron silicate, SAPO or ALPO molecular sieves have been found to be particularly effective as such sacrificial components. These are therefore used selectively or in combination in a preferred embodiment.

In particular, the molecular sieve is an aluminium silicate having a silicon-to-aluminium ratio of at least 25. For example, the ratio is in the range of from 25 to 150 and in particular in the range of from 30 to 50.

Preferred framework structures of such aluminium silicates are formed from the zeolite groups A, X, Y, BEA, MFI or MOR, and preferably BEA. In the case of the latter (BEA, MOR, MFI), this is the framework code according to the Structure Commission of the International Zeolite Association. Mixtures from a plurality of zeolite groups can also be chosen.

The catalyst is designed overall for the deactivation of catalyst poisons which are preferably selected from alkali metals, phosphorus, chromium and mercury. That is to say, the sacrificial component is suitably designed in particular in respect of these catalyst poisons in order to trap them. Such catalyst poisons are usually bonded in aerosol form and/or to ash or sulphur. Accordingly, in an expedient embodiment, the catalyst is designed for the deactivation of such catalyst poisons.

With regard to particularly effective binding of the catalyst poisons to the sacrificial component during operation, the amount of sacrificial component in an expedient embodiment is in the range of from 1/10 to 1/3% by weight and in particular approximately 1/5% by weight, based on the total mass of the catalyst. This amount, which is comparatively large in particular in comparison with the catalytically active component, reliably prevents the catalytically active centres of the catalytically active component from being replaced by the catalyst poisons.

As regards the clay minerals, sheet silicates have been found to be suitable. Preferably, therefore, the clay minerals are such sheet silicates.

Halloysite having the chemical structural formula $Al_4[(OH)_8|Si_4O_{10}]$ has been found to be particularly efficient and effective and is therefore preferably used as the clay mineral for the sacrificial component.

The at least one catalytically active component is vanadium oxide, namely vanadium pentoxide ($V_2O_5$). The amount of vanadium pentoxide is, for example, in the range of from 0.5 to 2% by weight, based on the catalyst mass.

In addition to the vanadium-based catalytically active component, one or more further catalytically active components are expediently added to the catalyst mass. In particular molybdenum oxide ($MoO_3$) and/or tungsten oxide ($WO_3$). The amount thereof is preferably in the range of from 1 to 4% by weight for $MoO_3$ and in the range of from 1 to 10% by weight for $WO_3$, based on the total mass of the catalyst.

The total amount of these further catalytically active components, together with a support mass, is preferably in the range of approximately from 1.0 to 5% by weight, based on the catalyst mass.

The catalyst mass consists for the most part of the support mass. The amount thereof is preferably approximately in the range of from 60 to 90% by weight, the smaller amounts being combined with larger amounts of the sacrificial component. The total amount of the sacrificial component together with the non-catalytic support mass is preferably in the range of from 85% to 95% by weight in total, based on the total catalyst mass.

All weight data are here based on the total weight of the catalyst mass, based on the sintered catalyst.

The object is further achieved according to the invention by a process for nitric oxide reduction in a waste gas, in particular of a combustion plant for biomass, by means of such a catalyst. In this process, a catalyst poison contained in the waste gas, in particular alkali metals, is absorbed by the sacrificial component. The combustion plant is in particular a large-scale plant preferably for the generation of energy.

Finally, the object is further achieved according to the invention by the use of a sacrificial component, selected from a zeolite and/or a clay mineral, in particular halloysite, for a catalyst for nitric oxide reduction in a waste gas of a combustion plant, wherein the sacrificial component serves to absorb a catalyst poison, in which the catalyst poison is deposited on the sacrificial component. The sacrificial component is in particular used as an addition to a catalyst mass.

Embodiments of the invention will be described hereinbelow.

The catalyst is either a plate catalyst or an extruded, in particular honeycomb catalyst. The basic formulation, that is to say the type and amount of the components of the catalyst mass, preferably corresponds to the basic formulation as is known from EP 0 762 925 B1, with the proviso that a sacrificial component is additionally added to the catalyst mass. The process for working up and producing the catalyst preferably also corresponds to the process which is to be found in EP 0 762 925 B1.

The catalyst is a vanadium-based catalyst with titanium dioxide as the support mass and an amount of vanadium pentoxide in the range of from 0.01 to 5% by weight, preferably from 0.5 to 2.0% by weight, based on the weight of the catalyst mass. There is further provided as the catalytically active component preferably molybdenum trioxide $MoO_3$ in an amount in the range of from 0.01 to less than 5% by weight and preferably in the range of from 1.5 to 4% by weight. Alternatively, a tungsten trioxide $WO_3$ is used instead of the molybdenum trioxide.

The catalyst mass further comprises a binder as well as fibres for improving the mechanical stability. The amount of binders, in particular clays, is, for example, in the range of from 2 to 7% by weight, as is the amount of fibres, in each case based on the total weight of the catalyst mass. Glass fibres are preferably used as the fibres.

The catalyst mass further comprises as the sacrificial component an addition of a zeolite or a clay mineral. The clay mineral is preferably halloysite. The amount of the sacrificial component is in the range of from 10 to 30% by weight. The amount of the support mass varies, in dependence on the amount of the sacrificial component, from approximately 60 to 85% by weight. The support mass and the sacrificial component together form an amount in the range of approximately 90% by weight, in particular in the range of, for example, from 85% by weight to 93% by weight.

Various compositions of a plate catalyst are given by way of example in Table 1 below.

TABLE 1

| Component | Ex. 1 [% by weight] | Ex. 2 [% by weight] | Ex. 3 [% by weight] |
| --- | --- | --- | --- |
| $TiO_2$ | 69.6 | 60.9 | 78.3 |
| Binder (bentonite) | 3.6 | 3.2 | 4.1 |
| Glass fibres | 3.6 | 3.2 | 4.1 |
| $MoO_3$ | 2.2 | 1.9 | 2.4 |
| $V_2O_5$ | 1.0 | 0.8 | 1.1 |
| Halloysite | 20.0 | 30.0 | 10.0 |

Alternatively, it is also possible to use a zeolite, for example of the group A, X, Y, BEO, MOR, MFI, instead of the halloysite indicated in the table. However, the use is not limited to these zeolite types.

The following compositions of the catalyst mass according to Table 2 are indicated by way of example for a fully extruded honeycomb catalyst:

TABLE 2

| Component | Ex. 1 [% by weight] | Ex. 2 [% by weight] | Ex. 3 [% by weight] |
| --- | --- | --- | --- |
| $TiO_2$ | 67.4 | 59.0 | 75.9 |
| Clay (bentonite) | 4.8 | 4.2 | 5.4 |
| Glass fibres | 6.5 | 5.6 | 7.2 |
| $MoO_3$ | 0.7 | 0.6 | 0.8 |
| $V_2O_5$ | 0.6 | 0.6 | 0.7 |
| Halloysite | 20.0 | 30.0 | 10.0 |

Here too, the halloysite indicated in the table can be replaced by a suitable zeolite.

The catalyst is preferably used generally in a combustion plant, in particular in a combustion plant for the generation of energy, for purifying the waste gas. In the combustion, biomass is used as the fuel or is at least added, so that the waste gas has a high dust content and also a high content of catalyst poisons, in particular alkali metals. Mention is to be made here of potassium as a particularly aggressive catalyst poison and of phosphorus, which has slightly lower aggressivity.

The waste gas is passed through the catalyst and thereby comes into contact with the surface of the catalyst mass. A reducing agent, such as ammonia or a precursor substance, such as, for example, urea, is supplied to the waste gas stream before it enters the catalyst. The nitric oxides contained in the waste gas are reduced in the catalyst to nitrogen and water. Owing to the large amount of the sacrificial component, catalyst poisons contained in the waste gas are absorbed by the sacrificial component, so that the catalyst poisons do not become deposited at the catalytically active centres of the catalyst mass and block it. The lifetime of the catalyst is thereby increased significantly as compared with a catalyst without such a sacrificial component, as a result of which improved waste gas quality and in particular also reduced operating costs are achieved.

The invention claimed is:

1. A process for treating waste gas from a combustion plant,
the method comprising contacting the waste gas with a reducing agent in the presence of a catalyst for nitric oxide reduction in a waste gas from a combustion plant, wherein the waste gas comprises nitric oxides, alkali metals, phosphorus, chromium, or mercury,
the catalyst comprising:
a first layer comprising a sacrificial component comprising halloysite, wherein the sacrificial component absorbs catalyst poison in the waste gas, and
a second layer comprising a catalytically active component which comprises (1) a vanadium oxide and (2) tungsten oxide and/or molybdenum oxide,
thereby reducing at least some of the nitric oxides to nitrogen and water;
wherein the first and second layer are configured such that the first layer is positioned as an outer component; and optionally, the second layer is located on or in a support substrate and the first layer is located at least partially over the second layer.

2. The process of claim 1, wherein the sacrificial component reacts with catalyst poisons selected from alkali metals, phosphorus, chromium and mercury.

3. The process of claim 1, wherein the sacrificial component absorbs catalyst poisons which are bonded in aerosol form and/or to ash or sulphur.

4. The process of claim 1, wherein the weight ratio of the sacrificial component to the catalytically active component is in the range of from 1/10 to 1/3.

5. The process of claim 1, wherein the catalytically active component comprises vanadium oxide and the catalytically active component is positioned on a support substrate.

6. The process of claim 1, wherein a combination of (1) the catalytically active components together with (2) a support mass is in the range of from 0.1% by weight to 10% by weight of the total weight of the catalyst.

7. The process of claim 1, where the catalyst comprises a support substrate comprising $TiO_2$ and the support substrate is present in the catalyst in an amount in the range of from 60 to 85% by weight.

8. The process of claim 1, wherein the first and second layer are configured such that the waste gas is subjected to the first layer before the second layer.

9. The process of claim 1, wherein the second layer is located on or in a support substrate and the first layer is located at least partially over the second layer.

10. The process of claim 1, wherein the first layer comprising the sacrificial component is located upstream of the second layer comprising the catalytically active component, when the catalyst is positioned in the direction of flow of the waste gas.

* * * * *